United States Patent Office 3,496,207
Patented Feb. 17, 1970

3,496,207
SULFONAPHTHYLAMINO THIOSULFATO COMPOUNDS AND THEIR PREPARATION
Frederick E. Barwick III and Gordon A. Geselbracht, Charlotte, N.C., assignors to Martin Marietta Corporation, a corporation of Maryland
No Drawing. Filed Sept. 25, 1967, Ser. No. 670,440
Int. Cl. C07c 143/04, 143/30
U.S. Cl. 260—453                7 Claims

ABSTRACT OF THE DISCLOSURE

There are disclosed herein the dyestuff intermediates of the formula R—NH—X—$SSO_3Z$, wherein R is a naphthyl radical selected from the group consisting of 8-hydroxy-6-sulfo-2-naphthyl, 5-hydroxy-7-sulfo-2-naphthyl, 8-hydroxy-4-sulfo-1-naphthyl, 6,8- or 5,7-disulfo-2-naphthl, 8-amino-4,5- or -5,7-disulfo-1-naphthyl, 5-, or 6-, or 7- or 8-sulfo-2-naphthyl, 8-hydroxy-4,6-disulfo-1-naphthyl, 4-sulfo-1-naphthyl, and the sodium or potassium salt form of said radicals; X is phenylene, ethylene, propylene,

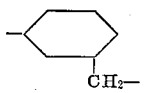

in which the —$CH_2$— is bonded to —$SSO_3Z$, chlorophenylene in which the Cl is ortho to the —$SSO_3Z$, methoxyphenylene in which the methoxy is meta to the —$SSO_3Z$,

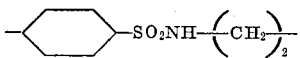

in which a methylene is bonded to the —$SSO_3Z$, or

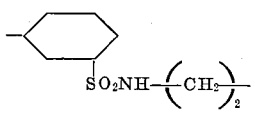

in which a methylene is bonded to the —$SSO_3Z$; and Z is H, Na or K. Also disclosed is a method for making R—NH—X—$SSO_3Z$ comprising heating an aqueous composition comprising approximately equimolar proportions of $H_2N$—X—$SSO_3Na$ and a sulfonic acid or salt thereof selected from the group consisting of 6- or 7-amino-1-naphthol-3-sulfonic acid, 8-amino-1-naphthol-5-sulfonic acid, 6- or 7-amino-1,3-naphthalenedisulfonic acid, 8-amino-1-naphthol-4,6- or 3,5- or 5,7-disulfonic acid, 6-amino-1- or 2-naphthalenesulfonic acid, 2-naphthol-7- or -8-sulfonic acid, 4,5-dihydroxy-1-naphthalenesulfonic acid, 4-amino-1-naphthalenesulfonic acid, 1,6-dihydroxy-3-naphthalenesulfonic acid and the sodium or potassium salt form of said acids, 3.5–7 molecular proportions NaHSO₃ per mole of $H_2N$—X—$SSO_3Na$, and either about 0.11 molecular proportions $Na_2CO_3$ or about 0.22 molecular proportions NaOH per mole of NaHSO₃; cooling; acidifying with a non-oxidizing mineral acid to about pH 3; evacuating substantially all $SO_2$ gas at 0°–25° C.; and collecting the resulting precipitated product which is in acid form, and which may be converted to the corresponding sodium or potassium salt form with aqueous NaOH, $Na_2CO_3$, KOH or $K_2CO_3$.

The present invention relates to thiosulfato compounds and method for making same.

The compounds of the present invention are particularly characterized in that they have the formula R—NH—X—$SSO_3Z$, wherein R is 8-hydroxy-6-sulfo-2-naphthyl, 5-hydroxy-7-sulfo-2-naphthyl, 8-hydroxy-4-sulfo-1-naphthyl, 6,8-disulfo-2-naphthyl, 5,7-disulfo-2-naphthyl, 8-amino-4,5-disulfo-1-naphthyl, 6-sulfo-2-naphthyl, 8-sulfo-2-naphthyl, 5-sulfo-2-naphthyl, 8-hydroxy-4,6-disulfo-1-naphthyl, 8-amino-5,7-disulfo-1-naphthyl, 7-sulfo-2-naphthyl, 4-sulfo-1-naphthyl, or the sodium or potassium salt form of said naphthyl radicals; X is phenylene, ethylene, propylene,

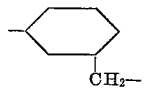

in which the —$CH_2$— is bonded to —$SSO_3Z$, chlorophenylene in which the Cl is ortho to the —$SSO_3Z$, methoxyphenylene in which the methoxy is meta to the —$SSO_3Z$,

in which a methylene is bonded to the —$SSO_3Z$, or

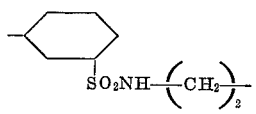

in which a methylene is bonded to the —$SSO_3Z$; and Z is H, Na or K.

Generally speaking, the method of the present invention is a process for making a compound of the formula $R_1$—NH—X—$SSO_3H$ comprising the steps of heating for 12–60 hours at 60°–105° C. and pH 6.2 an aqueous composition containing approximately equimolar proportions of $H_2N$—X—$SSO_3Na$ and a member selected from the group consisting of 7-amino-1-naphthol-3-sulfonic acid, 6-amino-1-naphthol-3-sulfonic acid, 8-amino-1-naphthol-5-sulfonic acid, 7-amino-1,3-naphthalenedisulfonic acid, 6-amino-1,3-naphthalenedisulfonic acid, 8-amino-1-naphthol-4,6-disulfonic acid, 6-amino-2-naphthalenesulfonic acid, 2-naphthol-8-sulfonic acid, 6-amino-1-naphthalenesulfonic acid, 4,5-dihydroxy-1-naphthalenesulfonic acid, 8-amino-1-naphthol-3,5-disulfonic acid, 8-amino-1-naphthol-5,7-disulfonic acid, 2-naphthol-7-sulfonic acid, 4-amino-1-naphthalenesulfonic acid, 1,6-dihydroxy-3-naphthalenesulfonic acid, and the sodium or potassium salt form of said acids, 3.5–7 molecular proportions NaHSO₃ per mole of $H_2N$—X—$SSO_3Na$, and about 0.11 molecular proportions $Na_2CO_3$ per mole of NaHSO₃ or about 0.22 molecular proportions NaOH per mole of NaHSO₃; cooling the composition to 0°–25° C.; adding thereto a nonoxidizing mineral acid until the pH reaches about 3 while maintaining 0°–25° C.; evacuating substantially all $SO_2$ gas; and collecting the resulting precipitate; wherein $R_1$ is 8-hydroxy-6-sulfo-2-naphthyl, 5-hydroxy-7-sulfo-2-naphthyl, 8-hydroxy-4-sulfo-1-naphthyl, 6,8-disulfo-2-naphthl, 5,7-disulfo-2-naphthyl, 8-amino-4,5-disulfo-1-naphthyl, 6-sulfo-2-naphthyl, 8-sulfo-2-naphthyl, 5-sulfo-2-naphthyl, 8-hydroxy-4,6-disulfo-1-naphthyl, 8-amino-5,7-disulfo-1-naphthyl, 7-sulfo-2-naphthyl, or 4-sulfo-1-naphthyl; and X is phenylene, ethylene, propylene,

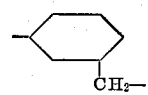

in which the —$CH_2$— is bonded to the divalent S atom of the thiosulfato radical, chlorophenylene in which the Cl is ortho to the divalent S atom of the thiosulfato radical, methoxyphenylene in which the methoxy is meta to the divalent S atom of the thiosulfato radical,

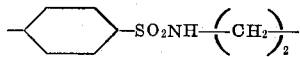

in which a methylene is bonded to the divalent S atom of the thiosulfato radical, or

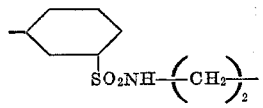

in which a methylene is bonded to the divalent S atom of the thiosulfato radical.

At this stage, the naphthyl radicals and thiosulfuric acid group of the $R_1$—NH—X—$SO_3H$ will be in their acid form; the $R_1$—NH—X—$SO_3H$ may be converted to the corresponding sodium salt form by stirring the $R_1$—NH—X—$SO_3H$ in an excess of 5–20% aqueous NaOH or $Na_2CO_3$ at about 25° C. for about 15 minutes, following which the compound may be caused to precipitate by addition of 20% aqueous NaCl and recovered by filtration. Likewise, the $R_1$—NH—X—$SO_3H$ in acid form may be converted to its corresponding

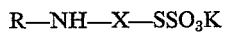

potassium salt form by stirring the $R_1$—NH—X—$SO_3H$ in an excess of 5–20% aqueous KOH or $K_2CO_3$ at about 25° C. for about 15 minutes, following which the R—NH—X—$SO_3K$ in potassium salt form may be caused to precipitate by adding 20% aqueous KCl and recovered by filtration.

It will be understood that in naming the foregoing naphthyl radicals, naphthol and naphthalene compounds, the naphthylene ring is numbered as follows:

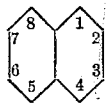

It will also be understood that in the foregoing nomenclature system sulfo designates —$SO_3H$, and thiosulfato radical designates —$SSO_3^-$, which may also be written

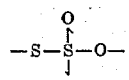

the left S being the divalent S atom of the radical.

The compounds of the present invention are particularly suitable as intermediates for use in making valuable water-soluble monoazo dyes. For example, equimolar amounts of the compounds of the present invention may be coupled in the conventional manner, in acid or alkaline aqueous media, at 0°–10° C. with a solution of a diazotized amine (azoic base), such as the primary amines shown at Lubs, The Chemistry of Synthetic Dyes & Pigments, pp. 196–207 (1955 ed.). The resulting dyes may be applied to cotton or regenerated cellulose fabric by the dyeing method described in Belgian Patent No. 681,524.

It is surprising and unexpected that the compounds of the present invention may be prepared, because one with skill in the art would expect the notoriously labile thiosulfate group to hydrolyze under the present reaction conditions. It is particularly surprising that the compounds of the present invention are useful as dye intermediates in making thiosulfate dyes fast to wet treatments, as the thiosulfate group promotes solubility in water, and the present intermediates have, in addition to a thiosulfate group, one or two sulfonic acid groups, which sulfonic acid groups are known to promote strongly solubility in water. Excessive numbers of water solubilizing groups on a dye molecule are customarily believed to render the dye non-fast to wet treatments and washing, and to render the dye tinctorially weak. It is therefore surprising that dyes made from the persent intermediates have good wash fastness. Moreover, many dyes made from the intermediates of the present invention have surprisingly strong tinctorial power.

The present invention is of particular value in contributing to greater flexibility in the thiosulfate dye making art. For example, it has been known in the prior art to couple one or two moles of diazotized aminophenylthiosulfates with a mole of a naphthol to make thiosulfate dyes (Canadian Patent No. 754,555, issued Mar. 14, 1967). However, in that case the diazo coupling component was necessarily restricted to aminophenylthiosulfates. One advantage of the present invention is that one preparing thiosulfate dyes may now choose any desired diazo coupling component for coupling with the intermediates of the present invention, unlimited by whether or not the diazo contains a thiosulfate group; accordingly a broad range of diazo compounds, and those known to have good fastness properties, may now be employed.

The process of the present invention readily lends itself to commercial adaptation, in that the materials are easy to handle, simple and inexpensive plant equipment may be used, and there are no difficult separation steps.

The following is a more detailed description of the present invention, and all parts herein are by weight unless otherwise specified.

If desired, $R_1$—NH—X—$SO_3H$, wherein $R_1$ and X are as above defined, may be prepared by mixing together in any order approximately equimolar proportions of $H_2N$—X—$SSO_3Na$ wherein X is as above defined, and an acid or salt thereof selected from the group consisting of 7-amino-1-naphthol-3-sulfonic acid,
6-amino-1-naphthol-3-sulfonic acid,
8-amino-1-naphthol-5-sulfonic acid,
7-amino-1,3-naphthalenedisulfonic acids,
6-amino-1,3-naphthalenedisulfonic acid,
8-amino-1-naphthol-4,6-disulfonic acid,
6-amino-2-naphthalenesulfonic acid,
2-naphthol-8-sulfonic acid,
6-amino-1-naphthalenesulfonic acid,
4,5-dihydroxy-1-naphthalenesulfonic acid,
8-amino-1-naphthol-3,5-disulfonic acid,
8-amino-1-naphthol-5,7-disulfonic acid,
2-naphthol-7-sulfonic acid,
4-amino-1-naphthalenesulfonic acid,
1,6-dihydroxy-3-naphthalenesulfonic acid, and the sodium or potassium salt form of said acids, 3.5–7 molecular proportions $NaHSO_3$ per mole of

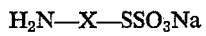

used, about 0.11 molecular proportions $Na_2CO_3$ per molecular proportion of $NaHSO_3$ used or about 0.22 molecular proportions NaOH per molecular proportion of $NaHSO_3$ used, and enough $H_2O$ to dissolve the mixture when subsequently heated; heating 12–60 hours at 60°–105° C. and pH 6.2; cooling to 0°–25° C.; adding a non-oxidizing mineral acid until the pH reaches about 3, while maintaining 0°–25° C.; evacuating substantially all $SO_2$ gas at 0°–25° C.; and collecting the resulting precipitated product.

However, for ease of materials handling, it is preferred to conduct the process as follows.

Warm water, at about 30°–50° C., may be charged into a vessel. Enough water is employed so that the reactants will dissolve when subsequently heated, and usually 2–4 parts water for each part $H_2N$—X—$SSO_3Na$ to be subsequently employed will be sufficient.

Mix into the warm water 3.5–7 molecular proportions $NaHSO_3$ for each molecular proportion

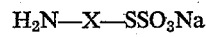

to be subsequently used.

Add thereto gradually during about 30 minutes, while stirring, either about 0.11 molecular proportions $Na_2CO_3$ per molecular proportions of $NaHSO_3$ previously used or about 0.22 molecular proportions NaOH per molecular proportion of $NaHSO_3$ previously used, to provide a composition buffered at pH 6.2. Adjust temperature to about 50° C.

Add one molecular proportion of a member selected from the group consisting of 7-amino-1-naphthol-3-sulfonic acid,
6-amino-1-naphthol-3-sulfonic acid,
8-amino-1-naphthol-5-sulfonic acid,
7-amino-1,3-naphthalenedisulfonic acid,
8-amino-1-naphthol-4,6-disulfonic acid,
6-amino-2-naphthalenesulfonic acid,
2-naphthol-8-sulfonic acid,
6-amino-1-naphthalenesulfonic acid,
4,5-dihydroxy-1-naphthalenesulfonic acid,
8-amino-1-naphthol-3,5-disulfonic acid,
8-amino-1-naphthol-5,7-disulfonic acid,
2-naphthol-7-sulfonic acid,
4-amino-1-naphthalenesulfonic acid,
1,6-dihydroxy-3-naphthalenesulfonic acid, and the sodium or potassium salt form of said acids.

Add one molecular proportion $H_2N$—$X$—$SSO_3Na$ wherein X is as above defined.

The composition is then heated slowly to 60°–105° C., and preferably to gentle reflux, at which temperature the reactants will be in solution, and held at the foregoing temperature range until the condensation reaction is substantially complete. The condensation reaction will be substantially complete when the composition has been heated at about 60°–105° C. for about 12–60 hours.

The composition is cooled to room temperature, preferably with stirring to accelerate the cooling, then cooled externally, such as by means of an ice bath, to 0°–25° C., and enough non-oxidizing mineral acid, such as HCl, $H_2SO_4$, or $H_3PO_4$ is added gradually thereto until about pH 3 is reached. During addition of the acid, the composition is maintained at 0°–25° C. The pH may be measured on Congo red test paper.

Substantially all $SO_2$ gas is then evacuated from the composition at 0°–25° C. The $SO_2$ gas may be evacuated by stirring the composition at 0°–25° C., and if desired this may be accelerated by also forcing air through the composition. Substantially all of the $SO_2$ gas will have been evacuated or liberated when the easily recognizable $SO_2$ odor is no longer detectable.

The resulting precipitated $R_1$—NH—X—$SSO_3H$ product, in acid form, may be collected by filtration, and washed free of mineral acid with 20% aqueous NaCl. If desired, the resulting product may be used as wet press cake, or optionally dried at about 50°–60° C.

The $R_1$—NH—X—$SSO_3H$ may be converted to its corresponding sodium or potassium salt form by stirring the $R_1$—NH—X—$SSO_3H$ in a slight excess of 5–20% aqueous NaOH, $Na_2CO_3$, KOH, or $K_2CO_3$ at about 25° C. for about 15 minutes. The product may be collected by slowly evaporating to dryness, or by adding 20% aqueous NaCl to cause precipitation and recovered by filtration.

The following are illustrative examples, in which all parts are by weight unless otherwise indicated.

EXAMPLE 1

The compound of the formula

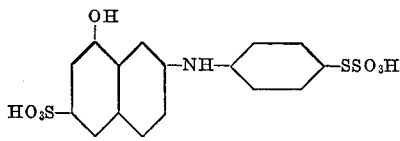

may be prepared as follows.

Charge 1 liter $H_2O$ at 40° C. into a 5-liter 3-neck flask. Mix therein by stirring 1,140 gms. $NaHSO_3$. Add gradually during 30 minutes 119 gms. $Na_2CO_3$. Heat to 50° C. Add 361 gms. 7-amino-1-naphthol-3-sulfonic acid. Add thereto 367 gms. sodium S-4-aminophenylthiosulfate. Heat the composition gradually over two hours until it reaches gentle reflux (102°–105° C.), and hold at gentle reflux for 48 hours. Remove the heat source and stir to room temperature. Cool externally with an ice bath to 10° C. While maintaining 10° C., add 700 gms. 32% aqueous HCl dropwise, resulting in pH 3. Stir 12 hours at 5°–9° C. to permit substantially all $SO_2$ gas to be liberated; collect the precipitated product by filtration; wash the product free of mineral acidity by flooding the filter cake on a vacuum filter three times with 20% aqueous NaCl; and optionally dry the resulting moist filter cake at 50°–60° C. Yield is approximately 80% of theory. Analysis may be conducted by titrating the product with standardized tetrazotized benzidine.

EXAMPLE 2

The compound of the formula

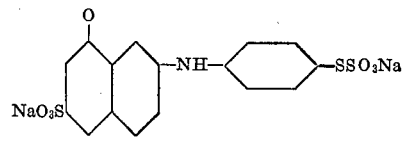

may be prepared by adding 150 ml. 5% NaOH to 42.7 gms. of the compound of Example 1, stirring 15 minutes at 25° C., adding 100 gms. 20% aqueous NaCl, and collecting the resulting precipitate by filtration.

EXAMPLE 3

The compound of the formula

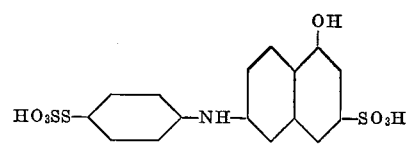

may be prepared as follows. This example is the same as Example 1 above, except that 361 gms. 6-amino-1-naphthol-3-sulfonic acid is substituted for the 7-amino-1-naphthol-3-sulfonic acid used in Example 1, and except that 90 gms. 50% aqueous NaOH is substituted for the 119 gms. $Na_2CO_3$ employed in Example 1. Yield is 75% of theory.

EXAMPLES 4–65

In the examples given in the following table, the procedure corresponds to that given under Example 1 above, and the examples in the table indicate that 6.68 g. M.W. $NaHSO_3$ is stirred into one liter $H_2O$ at 40° C., to which is gradually added 0.74 g. M.W. $Na_2CO_3$, and the composition heated to 50° C., whereby a composition buffered at pH 6.2 results. One g. M.W. of the acid in the second column is added, following which 1 g. M.W. of the thiosulfate in the third column is added. The composition is brought gradually, over a period of about 2 hours, to gentle reflux and there held 12–60 hours, and preferably about 48 hours, until the condensation reaction is substantially complete. The heat source is removed and the composition stirred until it reaches room temperature, following which it is cooled externally to 10° C. While maintaining 10° C., enough 32% aqueous HCl is added to bring the pH to about 3, and the composition is stirred at about 5° C. until substantially all the $SO_2$ gas has been liberated. The resulting precipitate is recovered by filtration, washed with 20% aqueous NaCl at 20° C. until free of mineral acid, and dried at 50°–60° C., resulting in the product of the fourth column. The percent theoretical yield is given in the fifth column. Trivial names of the sulfonic acids in the second column have been used for convenience, and the corresponding systematic names may be found at Lubs, supra, pp. 83, 689–690, and at Venkataraman, The Chemistry of Synthetic Dyes, Academic Press, N.Y.C., vol. 1, p. 171 (1952).

| Ex. No. | Acid | Thiosulfate | Product | Percent Yield |
|---|---|---|---|---|
| 4 | S acid | H₂N—⬡—SSO₃Na | HO₃SS—⬡—HN—[naphthalene with OH, SO₃H] | 63 |
| 5 | B acid | Same as above | H₂N, NH—⬡—SSO₃H on naphthalene with HO₃S and SO₃H | 65 |
| 6 | D acid | do | HO₃SS—⬡—NH—[naphthalene-SO₃H] | 52 |
| 7 | SS acid | do | H₂N, NH—⬡—SSO₃H on naphthalene with HO₃S and SO₃H | 50 |
| 8 | Dioxy J acid | do | HO₃S—[naphthalene]—NH—⬡—SSO₃H with OH | 70 |
| 9 | Amino G acid | H₂N—⬡—SSO₃Na | HO₃SS—⬡—NH—[naphthalene with SO₃H, SO₃H] | 61 |
| 10 | Broenner's acid | Same as above | HO₃SS—⬡—NH—[naphthalene-SO₃H] | 65 |
| 11 | Dioxy S acid | do | [naphthalene with SO₃H, OH]—NH—⬡—SSO₃H | 63 |
| 12 | F acid | do | HO₃S—[naphthalene]—NH—⬡—SSO₃H | 51 |
| 13 | Naphthionic acid | do | [naphthalene with SO₃H]—NH—⬡—SSO₃H | 42 |

| Ex. No. | Acid | Thiosulfate | Product | Percent Yield |
|---|---|---|---|---|
| 14 | J acid | 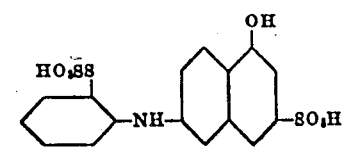 | 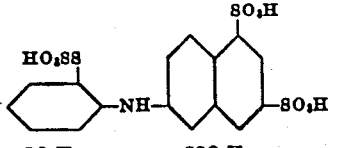 | 71 |
| 15 | Amino J acid | Same as above | | 52 |
| 16 | Crocein acid | do | 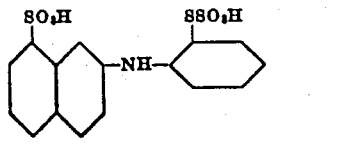 | 47 |
| 17 | K acid | do | 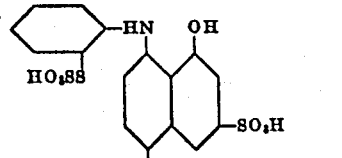 | 53 |
| 18 | Naphthionic acid | do | 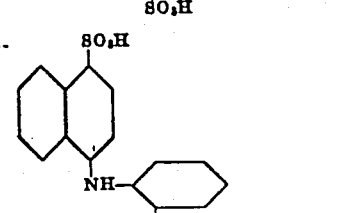 | 44 |
| 19 | J acid | H₂NCH₂CH₂SSO₃Na | 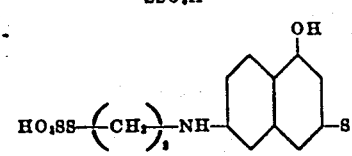 | 54 |
| 20 | S acid | Same as above | 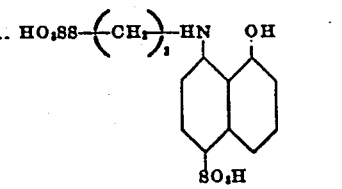 | 48 |
| 21 | Amino G acid | do | 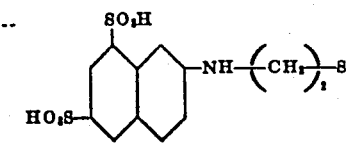 | 51 |
| 22 | Dioxy S acid | do | 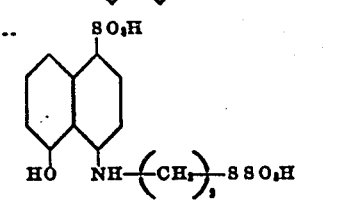 | 62 |
| 23 | SS acid | do | 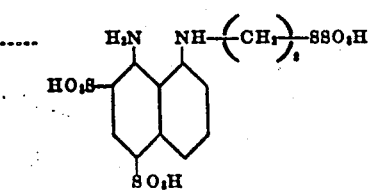 | 46 |

| Ex. No. | Acid | Thiosulfate | Product | Percent Yield |
|---|---|---|---|---|
| 24 | K acid | Same as Ex. No. 23 | (naphthalene with HO, NH-(CH$_2$)$_2$-SSO$_3$H, HO$_3$S, SO$_3$H) | 53 |
| 25 | Dioxy J acid | do | (naphthalene with OH, HO$_3$S, NH-(CH$_2$)$_2$-SSO$_3$H) | 61 |
| 26 | Amino J acid | H$_2$N-(CH$_2$)$_2$-SSO$_3$Na | (naphthalene with SO$_3$H, HO$_3$SS-(CH$_2$)$_2$-NH, SO$_3$H) | 49 |
| 27 | Gamma acid | Same as above | (naphthalene with SO$_3$H, HO$_3$SS-(CH$_2$)$_2$-NH, OH) | 50 |
| 28 | J acid | do | (naphthalene with OH, HO$_3$SS-(CH$_2$)$_2$-NH, SO$_3$H) | 42 |
| 29 | B acid | do | (naphthalene with SO$_3$H, HO$_3$S, H$_2$N, NH-(CH$_2$)$_2$-SSO$_3$H) | 44 |
| 30 | S acid | H$_2$N-(phenyl)-CH$_2$SSO$_3$Na | (phenyl-HN-naphthalene with HO$_3$SSCH$_2$, OH, SO$_3$H) | 64 |
| 31 | B acid | Same as above | (naphthalene with H$_2$N, NH-phenyl-CH$_2$SSO$_3$H, HO$_3$S, SO$_3$H) | 61 |
| 32 | K acid | do | (phenyl-HN-naphthalene with HO$_3$SS-CH$_2$, OH, SO$_3$H, SO$_3$H) | 57 |
| 33 | SS acid | do | (naphthalene with H$_2$N, N-phenyl-CH$_2$SSO$_3$H, HO$_3$S, SO$_3$H) | 43 |

| Ex. No. | Acid | Thiosulfate | Product | Percent Yield |
|---|---|---|---|---|
| 34 | Dioxy J acid | Same as Ex. No. 33 | [structure: HO₃S-naphthalene(OH)-NH-C₆H₄-CH₂-SSO₃H] | 62 |
| 35 | F acid | do | [structure: HO₃S-naphthalene-NH-C₆H₄-CH₂SSO₃H] | 51 |
| 36 | Dioxy S acid | do | [structure: HO-naphthalene(SO₃H)-NH-C₆H₄-CH₂SSO₃H] | 59 |
| 37 | D acid | do | [structure: SO₃H-naphthalene-NH-C₆H₄-CH₂SSO₃H] | 54 |
| 38 | Broenner's acid | do | [structure: HO₃S-naphthalene-NH-C₆H₄-CH₂SSO₃H] | 57 |
| 39 | Amino J acid | do | [structure: SO₃H, HO₃S-naphthalene-NH-C₆H₄-CH₂SSO₃H] | 43 |
| 40 | Gamma acid | [structure: H₂N-C₆H₃(Cl)-SSO₃Na] | [structure: OH, HO₃S-naphthalene-NH-C₆H₃(Cl)-SSO₃H] | 74 |
| 41 | J acid | Same as above | [structure: HO₃SS-C₆H₃(Cl)-NH-naphthalene(OH)-SO₃H] | 76 |
| 42 | S acid | do | [structure: HO₃SS-C₆H₃(Cl)-HN-naphthalene(OH)-SO₃H] | 68 |
| 43 | Amino G acid | do | [structure: HO₃SS-C₆H₃(Cl)-NH-naphthalene(SO₃H)-SO₃H] | 52 |
| 44 | Amino J acid | do | [structure: SO₃H, HO₃S-naphthalene-NH-C₆H₃(Cl)-SSO₃H] | 51 |

| Ex. No. | Acid | Thiosulfate | Product | Percent Yield |
|---|---|---|---|---|
| 45 | Crocein acid | Same as Ex. No. 44 | (naphthalene with SO₃H, NH-phenyl with Cl and SSO₃H) | 74 |
| 46 | Dioxy J acid | do | (HO₃SS-phenyl-Cl-NH-naphthalene with OH and SO₃H) | 75 |
| 47 | Gamma acid | H₂N-phenyl(OCH₃)-SSO₃Na | (naphthalene with OH, HO₃S; NH-phenyl with OCH₃ and SSO₃H) | 71 |
| 48 | J acid | Same as above | (HO₃SS-phenyl-OCH₃-NH-naphthalene with OH and SO₃H) | 74 |
| 49 | B acid | do | (naphthalene with H₂N, HO₃S, SO₃H; NH-phenyl with OCH₃ and SSO₃H) | 48 |
| 50 | D acid | do | (HO₃SS-phenyl(OCH₃)-NH-naphthalene with SO₃H) | 52 |
| 51 | Naphthionic acid | do | (naphthalene with SO₃H; NH-phenyl with OCH₃ and SSO₃H) | 41 |
| 52 | Broenner's acid | do | (HO₃S-naphthalene-NH-phenyl(OCH₃)-SSO₃H) | 54 |
| 53 | Dioxy S acid | do | (HO-naphthalene-SO₃H, NH-phenyl with OCH₃ and SSO₃H) | 67 |
| 54 | Crocein acid | do | (naphthalene with SO₃H; NH-phenyl with OCH₃ and SSO₃H) | 47 |
| 55 | F acid | H₂N-phenyl-SO₂NH-(CH₂)₂-SSO₃Na | (HO₃S-naphthalene-NH-phenyl-SO₂NH-(CH₂)₂-SSO₃H) | 49 |

| Ex. No. | Acid | Thiosulfate | Product | Percent Yield |
|---|---|---|---|---|
| 56 | Amino G acid | Same as Ex. No. 55 | HO₃S—[naphthalene(HO₃S)]—NH—[phenyl]—SO₂NH—(CH₂)₂—SSO₃H | 51 |
| 57 | Broenner's acid | do | HO₃S—[naphthalene]—NH—[phenyl]—SO₂NH—(CH₂)₂—SSO₃H | 55 |
| 58 | Crocein acid | do | [naphthalene(SO₃H)]—NH—[phenyl]—SO₂NH—(CH₂)₂—SSO₃H | 42 |
| 59 | D acid | do | [naphthalene(SO₃H)]—NH—[phenyl]—SO₂NH—(CH₂)₂—SSO₃H | 62 |
| 60 | SS acid | do | HO₃S—[naphthalene(HO₃S)(NH₂)]—NH—[phenyl]—SO₂NH—(CH₂)₂—SSO₃H | 42 |
| 61 | Dioxy S acid | [phenyl]—NH₂ with SO₂NH—(CH₂)₂—SSO₃Na | [naphthalene(SO₃H)(HO)]—NH—[phenyl]—SO₂NH—(CH₂)₂—SSO₃H | 62 |
| 62 | K acid | Same as above | HO—[naphthalene(HO₃S)(SO₃H)]—NH—[phenyl]—SO₂NH—(CH₂)₂—SSO₃H | 51 |
| 63 | F acid | do | HO₃S—[naphthalene]—NH—[phenyl]—SO₂NH—(CH₂)₂—SSO₃H | 44 |

| Ex. No. | Acid | Thiosulfate | Product | Percent Yield |
|---|---|---|---|---|
| 64 | Naphthionic acid | Same as Ex. No. 63 | 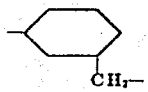 | 41 |
| 65 | J acid | 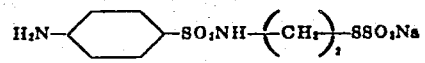 | 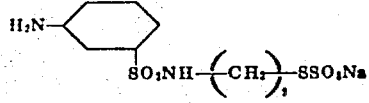 | 75 |

It will be noted that in the foregoing examples the acid form of the sulfonic acids have been employed as starting materials; however, the corresponding sodium or potassium salt form of said sulfonic acids may be substituted therefor to produce the same products produced in the above examples. Also, the end products produced in the above examples are in their acid form, and they may be converted to their sodium or potassium salt form by the method previously described above.

The thiosulfate compounds used in the above examples to prepare the compounds of the present invention may be prepared by known methods as follows. One g. M.W. of 4,4'-diaminodiphenyldisulfide (U.S. Pat. No. 1,933,217), 3,3'-diaminodiphenyldisulfide (Beil. vol. 13, p. 426), 2,2'-diaminodiphenyldisulfide (Chem. Ab. 28: p. 489[5]), 4,4'-diamino - 2,2' - dichlorodiphenyldisulfide (Chem. Ab. 51: p. 16435c), or 4,4'-diamino-3,3'-dimethoxydiphenyldisulfide (Chem. Ab. 22: 1965[8]) may be heated with 4 g. M.W. sodium sulfite, and 3,500 ml. water at 75° C., while maintaining pH 7–8 with acetic acid, until the reactants are in solution (about 48 hours) to cleave the disulfide molecule between the S atoms and produce 2 molecules of the corresponding sodium S-2- or -3- or -4-aminophenylthiosulfate, sodium S-4-amino-2-chlorophenylthiosulfate, or sodium S-4-amino-3-methoxyphenylthiosulfate; and they may be recovered from solution by evaporating to dryness or salting out with NaCl. The following thiosulfate compounds may be produced according to the reference cited after each one:

$H_2N(CH_2)_2SSO_3Na$ (Chem. Ab. 47: p. 6860h);
$H_2N(CH_2)_3SSO_3Na$ (Chem. Ab. 48: p. 11485c);

Sodium S-3-aminobenzylthiosulfate [J. Chem. Soc. vol. 93, p. 1404 (1908), and U.S. Pat. No. 3,151,144]; and

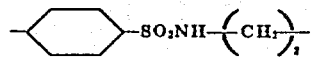

(Belgium Patent 644,759).

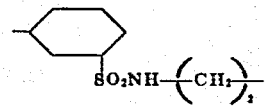

may be prepared by condensing equimolar amounts m-nitrobenzenesulfonyl chloride and 2-aminoethylthiosulfuric acid, reducing the resulting nitro compound with iron as in U.S. Patent No. 3,151,144, and rendering the result alkaline with a slight excess of NaOH at 25° C.

In the process of the present invention, the naphthyl radicals of the final products are produced from the sulfonic acids employed herein as follows. 8-hydroxy-6-sulfo-2-naphthyl is derived from gamma acid, 5-hydroxy-7-sulfo-2-naphthyl is derived from J acid or dioxy J acid, 8-hydroxy-4-sulfo-1-naphthyl is derived from S acid or dioxy S acid, 6,8-disulfo-2-naphthyl from amino G acid, 5,7-disulfo-2-naphthyl from amino J acid, 8- amino-4,5-disulfo-1-naphthyl from B acid, 6-sulfo-2-naphthyl from Broenner's acid, 8-sulfo-2-naphthyl from crocein acid, 5-sulfo-2-naphthyl from D acid, 8-hydroxy-4,6-disulfo-1-naphthyl from K acid, 8-amino-5,7-disulfo-1-naphthyl from SS acid, 7-sulfo-2-naphthyl from F acid, and 4-sulfo-1-naphthyl from naphthionic acid.

What is claimed is:
1. A compound of the formula R—NH—X—SSO$_3$Z, wherein
R is 8-hydroxy-6-sulfo-2-naphthyl, 5-hydroxy-7-sulfo-2-naphthyl, 8-hydroxy-4-sulfo-1-naphthyl, 6,8-disulfo-2-naphthyl, 5,7-disulfo-2-naphthyl, 8-amino-4,5-disulfo-1-naphthyl, 6-sulfo-2-naphthyl, 8-sulfo-2-naphthyl, 5-sulfo-2-naphthyl, 8-hydroxy-4,6-disulfo-1-naphthyl, 8-amino-5,7-disulfo-1-naphthyl, 7-sulfo-2-naphthyl, 4-sulfo-1-naphthyl, or the sodium or potassium salt form of said naphthyl radicals;
X is phenylene, ethylene, propylene,

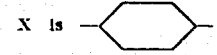

in which the —CH$_2$— is bonded to the —SSO$_3$Z, chlorophenylene in which the Cl is ortho to the —SSO$_3$Z, methoxyphenylene in which the methoxy is meta to the —SSO$_3$Z,

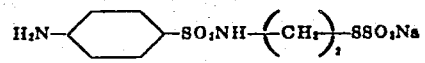

in which a methylene is bonded to the —SSO$_3$Z, or

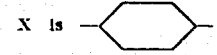

in which a methylene is bonded to the —SSO$_3$Z; and
Z is H, Na or K.
2. A compound as defined in claim 1, and in which X is 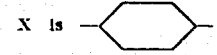

3. The compound of the formula

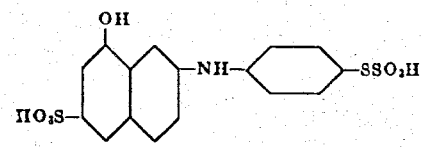

4. The compound of the formula

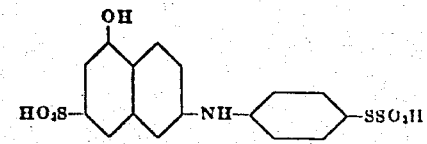

5. A method for making a compound of the formula $R_1$—NH—X—$SSO_3H$, comprising the steps of heating for 12–60 hours at 60°–105° C. and pH 6.2 an aqueous composition containing approximately equimolar proportions of $H_2N$—X—$SSO_3Na$ and a member selected from the group consisting of 7-amino-1-naphthol-3-sulfonic acid,
6-amino-1-naphthol-3-sulfonic acid,
8-amino-1-naphthol-5-sulfonic acid,
7-amino-1,3-naphthalenedisulfonic acid,
6-amino-1,3-naphthalenedisulfonic acid,
8-amino-1-naphthol-4,6-disulfonic acid,
6-amino-2-naphthalenesulfonic acid,
2-naphthol-8-sulfonic acid,
6-amino-1-naphthalenesulfonic acid,
4,5-dihydroxy-1-naphthalenesulfonic acid,
8-amino-1-naphthol-3,5-disulfonic acid,
8-amino-1-naphthol-5,7-disulfonic acid,
2-naphthol-7-sulfonic acid,
4-amino-1-naphthalenesulfonic acid, and the sodium or potassium salt form of said acids, 3.5–7 molecular proportions $NaHSO_3$ per molecular proportion of $H_2N$—X—$SSO_3Na$, and an alkali selected from the group consisting of about 0.11 molecular proportions $Na_2CO_3$ per molecular proportion of $NaHSO_3$ and about 0.22 molecular proportions NaOH per molecular proportion of $NaHSO_3$; cooling the composition to 0°–25° C.; adding thereto a non-oxidizing mineral acid until about pH 3 is reached, while maintaining 0°–25° C.; evacuating substantially all $SO_2$ gas at 0°–25° C.; and collecting the resulting precipitate; wherein $R_1$ is 8-hydroxy-6-sulfo-2-naphthyl,
5-hydroxy-7-sulfo-2-naphthyl,
6,8-disulfo-2-naphthyl,
5,7-disulfo-2-naphthyl,
8-amino-4,5-disulfo-1-naphthyl,
6-sulfo-2-naphthyl,
8-sulfo-2-naphthyl,
5-sulfo-2-naphthyl,
8-hydroxy-4,6-disulfo-1-naphthyl,
8-amino-5,7-disulfo-1-naphthyl,
7-sulfo-2-naphthyl, or
4-sulfo-1-naphthyl, and X is phenylene, ethylene, propylene,

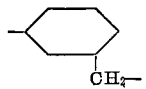

in which the —$CH_2$— is bonded to the divalent S atom of the thiosulfato radical, chlorophenylene in which the Cl is ortho to the divalent S atom of the thiosulfato radical, methoxyphenylene in which the methoxy is meta to the divalent S atom of the thiosulfato radical,

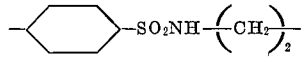

in which a methylene is bonded to the divalent S atom of the thiosulfato radical, or

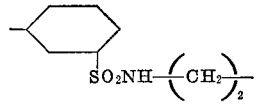

in which a methylene is bonded to the divalent S atom of the thiosulfato radical.

6. A method as defined in claim 5, and further characterized in that $R_1$ is 8-hydroxy-6-sulfo-2-naphthyl, the sulfonic acid is 7-amino-1-naphthol-3-sulfonic acid, the non-oxidizing mineral acid is HCl, the alkali is about 0.11 molecular proportion $Na_2CO_3$ per molecular proportion of $NaHSO_3$, and in which the heating is at reflux.

7. A method as defined in claim 5, and further characterized in that $R_1$ is 5-hydroxy-7-sulfo-2-naphthyl, the sulfonic acid is 6-amino-1-naphthol-3-sulfonic acid, the non-oxidizing mineral acid is HCl, the alkali is about 0.11 molecular proportion of $Na_2CO_3$ per molecular proportion of $NaHSO_3$, and in which the heating is at reflux.

References Cited

UNITED STATES PATENTS

| | | |
|---|---|---|
| 2,245,971 | 6/1941 | Felix et al. |
| 3,346,587 | 10/1967 | Geselbracht. |
| 3,364,247 | 1/1968 | Gollis. |
| 3,908,381 | 10/1968 | Westland. |
| 3,913,330 | 11/1968 | Westland. |

FOREIGN PATENTS 644,759  7/1964  Belgium.

CHARLES B. PARKER, Primary Examiner

S. T. LAWRENCE III, Assistant Examiner

U.S. Cl. X.R.

8—41, 51; 260—192, 198

UNITED STATES PATENT OFFICE
CERTIFICATE OF CORRECTION

Patent No. 3,496,207                                             February 17, 1970

Frederick E. Barwick III, et al.

It is certified that error appears in the above identified patent and that said Letters Patent are hereby corrected as shown below:

Column 1, line 17, "naphthl" should read -- naphthyl --. Column 2, line 54, "naphthl" should read -- naphthyl --. Column 6, lines 16 to 22, the left-hand portion of the formula reading

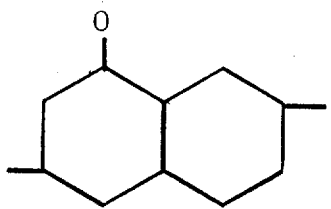 should read 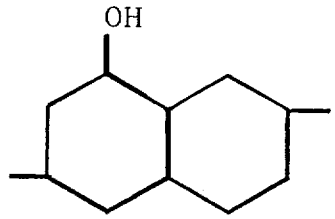

Columns 9 and 10, in the table, opposite Ex. 19, second column, "$H_2NCH_2CH_2SSO_2Na$" should read -- $H_2NCH_2CH_2SSO_3Na$ --. Columns 15 and 16, in the table, opposite Ex. 45, fifth column, "74" should read -- 47 --. Column 22, line 28, "proportion" should read -- proportions --.

Signed and sealed this 24th day of November 1970.

(SEAL)
Attest:

EDWARD M. FLETCHER, JR.                          WILLIAM E. SCHUYLER, JR.
Attesting Officer                                            Commissioner of Patents